UNITED STATES PATENT OFFICE.

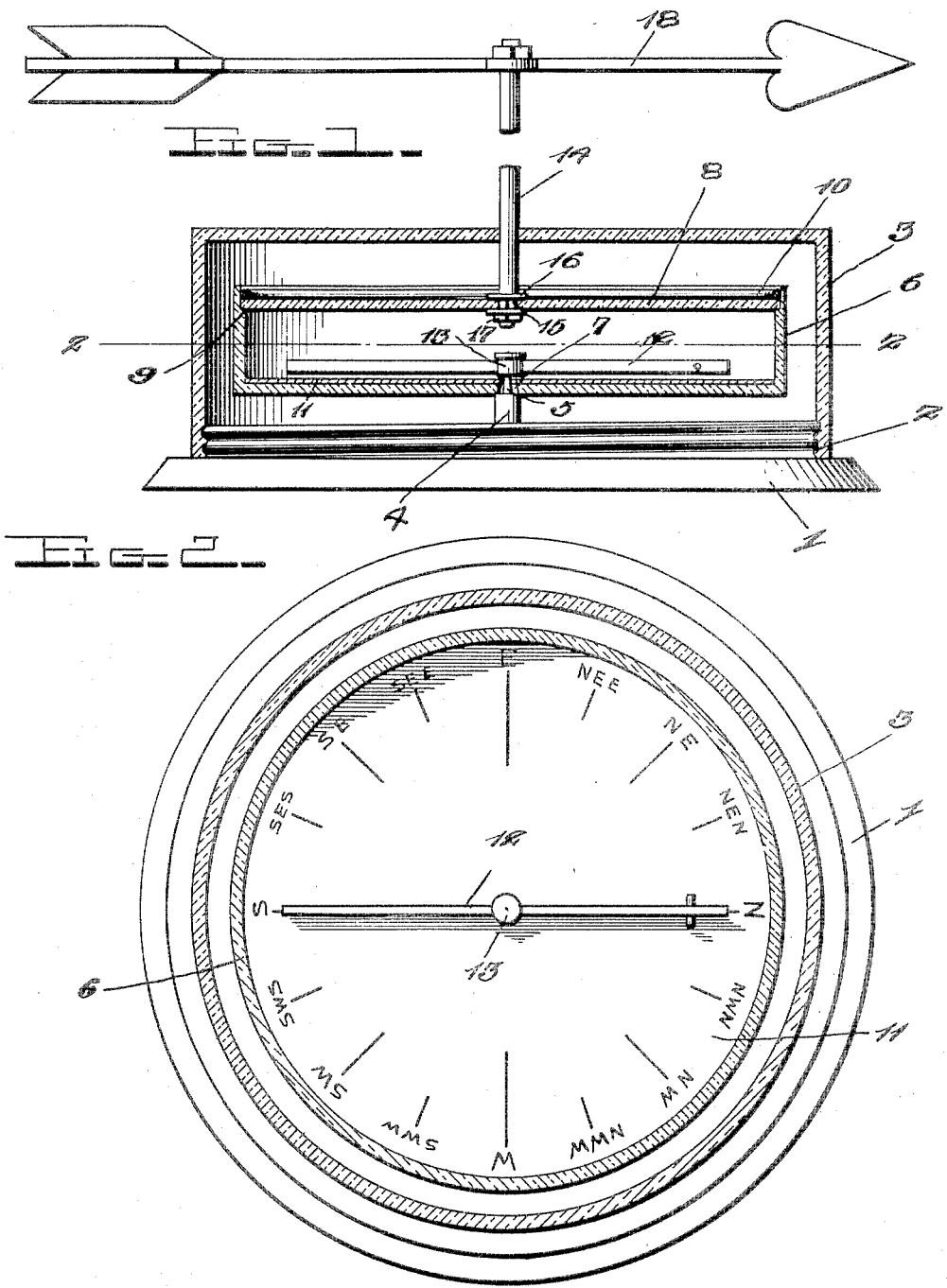

GEORGE W. RICKETTS, OF PHILADELPHIA, PENNSYLVANIA, ASSIGNOR OF ONE-THIRD TO HARRY LEADUM, OF PHILADELPHIA, PENNSYLVANIA.

WIND-INDICATOR.

1,068,169.   Specification of Letters Patent.   Patented July 22, 1913.

Application filed March 16, 1912. Serial No. 684,317.

*To all whom it may concern:*

Be it known that I, GEORGE W. RICKETTS, a citizen of the United States, residing at Philadelphia, in the county of Philadelphia and State of Pennsylvania, have invented certain new and useful Improvements in Wind-Indicators, of which the following is a specification, reference being had to the accompanying drawings.

My invention relates to new and useful improvements in the art of measuring instruments and more particularly to a device known as a wind indicator, and my object is to provide a device of this character which may be readily used on both sea and land for indicating to those within a housing the direction in which the wind is blowing.

A further object of the invention resides in the provision of a substantial compass mechanism in connection with a weather vane, and a still further object resides in providing a disk such as is used in compasses and mounting the same on the lower end of the rod carrying the weather vane, whereby said disk will be rotated with the rotation of the vane.

A further object of the invention resides in the provision of a device which is extremely simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a vertical section through the device, and, Fig. 2 is a horizontal section therethrough as seen on line 2—2, Fig. 1.

In carrying out my invention, I shall refer to the drawing in which similar reference characters designate corresponding parts throughout the several views and in which—

1 indicates a circular base member of any desired size, whatsoever, having a threaded portion 2 thereon, and engaged with the threaded portion, is the lower threaded portion of a cylindrical housing or casing 3 which is preferably formed of glass. Extending vertically from the center of the top face of the base 1, is a stub shaft or spindle 4 which has the upper portion thereof reduced considerably to form a stem 5, the purpose of which will be hereinafter and more particularly described, and an additional cylindrical casing or housing 6 has a central opening 7 in the bottom thereof which receives therethrough, the stem 5, said opening being of such size as to permit the casing 6 to rest upon the shoulder formed between the stem and the main portion of said shaft 4. This casing or housing 6 is also preferably formed of glass having a removable top 8 thereon, which top rests on an annular shoulder 9 formed on the inner face of the wall of said casing adjacent the upper edge thereof. This top 8 is adapted to be securely held in position on the shoulder 9 by means of a spring wire member 10 which is engaged with the top to spring tightly against the inner face of the reduced portion of the side walls of said casing or housing 6.

Mounted on the bottom of the casing or housing 6, is a dial 11 having the various points of the compass marked thereon, such as "North," "East," "South," "West" and the intermediate points, said dial being also provided with a central opening in alinement with the opening 7 in the bottom of the casing 6 to permit the stem 5 to pass therethrough, and a compass needle 12 of the usual or any preferred type is disposed within said casing 6, said compass needle having the usual central socket 13 therein which receives the free end of the stem 5. The needle is so positioned as to be spaced a slight distance above the upper face of the dial, whereby it will be appreciated that the casing 6 may be revolved on its axis independently of the needle, which normally points northward, and a shaft 14 which is rotatably disposed through a central opening in the top of the casing 3, has the lower end thereof which extends within said casing, squared, as shown at 15, and extended through a central square opening in the top 8 of the casing 6. Washers 16 are positioned on the squared portion 15 of the shaft above and below the top, and a nut 17 engaged with the extreme lower end of the shaft 14.

is turned into engagement with one of the washers to securely retain the top 8 to said shaft, whereby it will be appreciated that said casing 6 may be properly supported in the casing 3 and designed to rotate therewithin upon the rotation of the shaft. This shaft 14 may be of any desired length, whatsoever, and removably mounted on the upper end thereof, is a weather vane 18 designed in the form of an arrow, as usual, and in positioning said vane upon the shaft, the head thereof is directed to point to the "North" point indicated on the dial 11. The "East" and "West" points and their respective intermediate points are positioned on the dial reversely to the actual positions of the same with respect to the "North" and "South" points, and thus when the vane 18 is turned in the direction in which the wind is blowing, the dial which will obviously be turned therewith, will dispose a point thereon in position below or immediately adjacent the point of the needle 12 to indicate the exact direction from which the wind is blowing, it being understood that said needle 12 always points to the north.

In practice, the base portion of the device with its adjunctive parts, is adapted to be disposed in a housing and the shaft 14 extended through the roof thereof to permit the vane at the upper end thereof to be directed by the wind. If used on ships, to which the same is particularly adapted, this device will, of course, be positioned in the pilot-house, and it will be appreciated that as the wind blows to turn the vane 18, the casing or housing 6 with the dial in the bottom thereof, will correspondingly be turned to allow the points from which the wind is blowing, to be disposed below the needle 12 which normally points northward. This device, therefore, may be used as a combined mariner's compass and wind indicator, thereby simplifying the usual construction for the two devices mentioned.

From the foregoing, it will be seen that I have provided an extremely simple, inexpensive and efficient device for carrying out the objects of the invention, and while I have particularly described the elements most well adapted to perform the functions set forth, it is obvious that various changes in form, proportion and in the minor details of construction may be resorted to without departing from the spirit or sacrificing any of the principles of the invention.

What I claim is:—

1. A device of the class described, comprising a casing, a dial rotatably mounted therewithin, a needle disposed over said dial and movable entirely independent of the latter, a weather vane, and connecting means between said vane and dial to move the latter with the movements of the former.

2. A wind indicator, comprising a casing, an additional casing revolubly mounted therewithin, a dial carried in the bottom of said latter casing, a needle disposed within the last mentioned casing and mounted on the axis thereof over said dial, a weather vane, and connecting means between said vane and additional casing to move the latter with the movements of the former.

3. A wind indicator, comprising a base member, a casing removably mounted thereon, a stem mounted centrally of the base member, a dial rotatably mounted on said stem, a needle carried on said stem above the dial and independent thereof, a weather vane, and connecting means between said vane and the dial to rotate the latter upon the rotation of the former.

4. A wind indicator, comprising a base member having a stem extending therefrom, said stem being reduced at its free end, a casing removably mounted on said base member, an additional casing rotatably supported on said stem, the reduced portion of said stem being extended through the bottom of said latter casing, a dial mounted on the bottom of said last mentioned casing, a needle supported on the free end of the reduced portion of the stem and independent of the additional casing, a weather vane, and connecting means between the vane and said additional casing to rotate the latter upon the rotation of the former.

5. A wind indicator, comprising a base member having a central stem extending therefrom, said stem being reduced at its free end, a casing removably mounted on said base member, an additional casing disposed therewithin and revolubly supported on said stem, the reduced portion of said stem extending within said latter casing, a dial mounted in the bottom of said additional casing, a needle carried on the free end of the reduced portion of the stem, a shaft secured to the center of the top of said additional casing and rotatably disposed through the top of said first mentioned casing, and a weather vane carried on the outer end of said shaft.

6. A wind indicator, comprising a base member having a central stub shaft thereon, said shaft being reduced at its free end to form a stem, a casing removably engaged with the base member, an additional casing disposed within said first mentioned casing and provided with a central opening in the bottom thereof, said last mentioned casing bottom being revolubly mounted on the shoulder formed on said stub shaft, a dial mounted in the bottom of said additional casing, a needle disposed within said additional casing and mounted on the free end of said stem independent of said latter casing, a shaft removably engaged with the center of the top of said additional casing and rotatably disposed through the top of said first mentioned casing, and a weather vane secured to the outer end of said shaft, whereby said additional casing will be caused to move with the movements of said weather vane.

In testimony whereof I hereunto affix my signature in the presence of two witnesses.

GEORGE W. RICKETTS.

Witnesses:
 WM. F. RANSOM,
 ALEX GREEN.